J. McKEEVER.
Bolt-Extractor.
No. 222,295.    Patented Dec. 2, 1879.
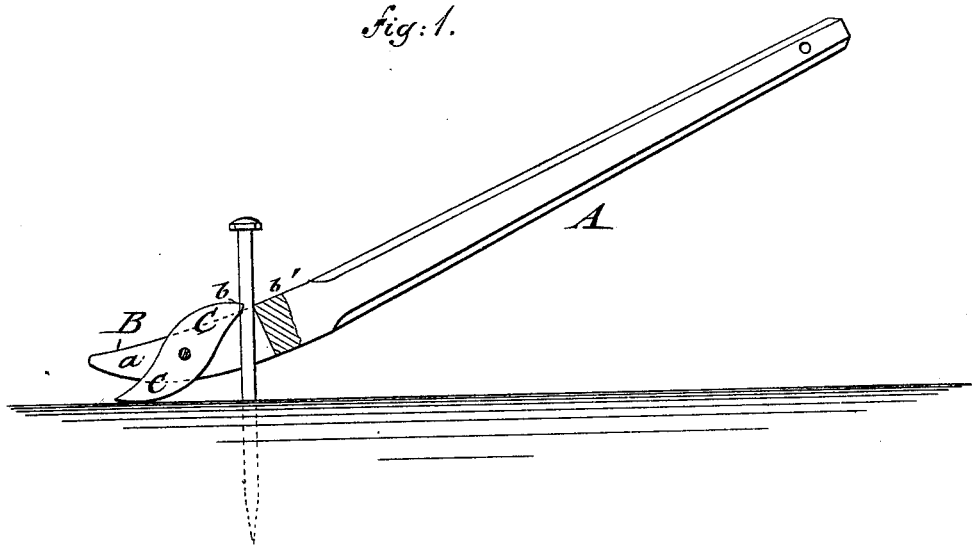
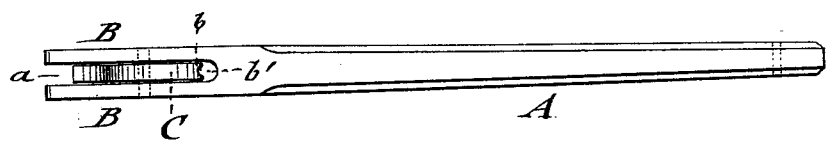
WITNESSES:
Carl Rapp
Otto Risch
INVENTOR
John McKeever
By Paul Goepel
ATTORNEY

UNITED STATES PATENT OFFICE.

JOHN McKEEVER, OF JERSEY CITY, NEW JERSEY.

IMPROVEMENT IN BOLT-EXTRACTORS.

Specification forming part of Letters Patent No. 222,295, dated December 2, 1879; application filed October 8, 1879.

*To all whom it may concern:*

Be it known that I, JOHN McKEEVER, of Jersey City, in the county of Hudson and State of New Jersey, have invented certain new and useful Improvements in Bolt-Extractors, of which the following is a specification.

In the accompanying drawings, Figure 1 represents a side elevation, partly in section, of my improved bolt-extractor; and Fig. 2 is a top view of the same.

Similar letters of reference indicate corresponding parts.

The object of this invention is to facilitate the withdrawal of bolts from timber in such a manner that the bolts are not bent or injured, and can be used again.

In carpentry, boat-building, and similar trades, a shackle-bar has been heretofore employed for withdrawing heavy bolts from timber; but these bend the bolts, so that they cannot be used again.

This my invention is intended to prevent; and it consists of a bar in the nature of a crowbar, to the recessed end of which a claw or dog is fulcrumed, which, in connection with the bar, "bites" into the shank of the bolt, and extracts the same gradually by successively applying the bar to the bolt.

Referring to the drawings, A represents a strong hand-bar, the lower end of which is rounded off at the under side, and provided with a central recess, *a*. To the cheeks B of the recessed portion of the bar is fulcrumed a steel claw or dog, C, of flat S shape, the upper end of which has a concave notch, *b*, which faces the transverse rear edge, *b'*, of the recessed portion of the bar.

For drawing the bolt, the recessed end of the bar is placed over the bolt to be extracted, so that the lower curved end of the dog rests on the timber, while the notched end *b* of the dog, jointly with the edge *b'* of the recessed part, takes hold of the shank of the bolt. By raising the bar, the dog and the transverse edge of the recessed part of the bar bite the shank and lift the bolt bodily from the wood on raising the handle end of the bar. By successively applying the extractor in this manner, the bolt is withdrawn from the wood in perfectly straight condition, so as to be capable of being used again.

The tool is of considerable advantage to carpenters, boat-builders, and others, as it effects the quick withdrawal of bolts in a superior manner to the devices heretofore employed for this purpose.

Having thus described my invention, I claim as new and desire to secure by Letters Patent—

1. The combination of handle-bar A, having a recess, *a*, at its lower end, with a dog, C, that is centrally fulcrumed to the cheeks of the recessed end, and provided at one end with a nick, *b*, all as described.

2. The combination of a handle-bar, having a recessed and rounded-off lower end, with a dog that is fulcrumed to the cheeks of the recessed end, said dog being rounded off at diagonally-opposite sides, and notched at one end, substantially as specified.

In testimony that I claim the foregoing as my invention I have signed my name, in presence of two witnesses, this 2d day of October, 1879.

JOHN McKEEVER.

Witnesses:
SAML. SHIPLEY,
THOS. SHIPLEY.